United States Patent
Chheda

(10) Patent No.: US 6,898,044 B1
(45) Date of Patent: May 24, 2005

(54) METHOD FOR CALCULATING A FORMAT SPECIFIC PARAMETER IN A DISK DRIVE HAVING DIFFERING SURFACE FORMATS

(75) Inventor: Nalin H. Chheda, Cerritos, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 194 days.

(21) Appl. No.: 10/427,499

(22) Filed: Apr. 30, 2003

(51) Int. Cl.[7] .............................................. G11B 27/10
(52) U.S. Cl. ........................ 360/75; 360/49; 711/207
(58) Field of Search ............................ 360/67, 48–49, 360/51, 69, 72.2, 78.04, 78.14; 711/4, 112, 203, 205, 207

(56) References Cited

U.S. PATENT DOCUMENTS

| | | | | |
|---|---|---|---|---|
| 6,091,559 A | * | 7/2000 | Emo et al. ..................... | 360/48 |
| 6,137,644 A | * | 10/2000 | Hetzler et al. ................. | 360/48 |
| 6,233,106 B1 | * | 5/2001 | Chambers .................... | 360/49 |
| 6,239,937 B1 | * | 5/2001 | Troemel ....................... | 360/75 |
| 6,256,160 B1 | * | 7/2001 | Liikanen et al. .............. | 360/48 |
| 6,445,525 B1 | * | 9/2002 | Young .......................... | 360/48 |
| 6,560,052 B2 | * | 5/2003 | Ng et al. ...................... | 360/48 |
| 6,757,119 B2 | * | 6/2004 | Leow et al. .................. | 360/48 |

* cited by examiner

Primary Examiner—Sinh Tran
Assistant Examiner—James L Habermehl
(74) Attorney, Agent, or Firm—Won Tae C. Kim, Esq.; Ramin Mobarhan, Esq.

(57) ABSTRACT

A method is disclosed for selecting format specific parameters in a disk drive comprising a control system and a plurality of disk surfaces each having a surface format for storing data, wherein at least one surface format is different than other surface formats. The method includes initializing the disk drive for operation, receiving a data transfer command, and selecting a disk surface for performing data transfer operations based on the received data transfer command. The method further includes selecting a format specific data structure corresponding to the selected disk surface, calculating a format specific variable using the selected format specific data structure, and performing the data transfer operations by the control system based on the calculated variable.

12 Claims, 4 Drawing Sheets

METHOD FOR CALCULATING A FORMAT SPECIFIC PARAMETER IN A DISK DRIVE HAVING DIFFERING SURFACE FORMATS

FIELD OF THE INVENTON

This invention relates to data sectors on disks in a disk drive. More particularly, the invention is directed to determining the host wedge for a selected sector on a disk.

BACKGROUND OF THE INVENTON

Disk drives conventionally partition disk surfaces into logical zones for optimizing storage capacity by varying bit density within each of the logical zones. The zones may be visualized as concentric bands of tracks with a varying progression of bit density from band to band. Each zone stores a range of user data blocks which are addressed by a host computer using a logical block address (LBA). The disk drive comprises an intelligent control system which translates the host specified LBA into an internal address. As is known in the art, the internal address may result from a translation process that translates the LBA into an internal absolute block address (ABA) that is eventually translated into a physical sector address and track address. Additionally, a disk is further partitioned into servo sectors disposed on the disk between angularly-spaced wedge-like areas for use in positioning the head over a desired track during write and read operations.

The disk drive control system may maintain a set of wedge position tables where each table provides information as to which wedge in a given disk a selected sector belongs to. In this way, a wedge position tables enables the control system to determine in which wedge a given user data block resides by searching the wedge position tables to locate the sector corresponding to the block address.

In most cases, the disk drive control system can accomplish this table search without compromising performance because the wedge position tables are stored in memory when the drive is initialized for operation and only one set of tables is required because each disk surface has an identical format. The highly competitive disk drive market has more recently driven initiatives to minimize cost by allowing for variations in surface format such that multiple sets of wedge position tables may be required. Detrimentally, this could require increased memory for storing the tables and increased processor execution overhead to perform searches of the expanded tables.

Accordingly, what is needed is a method for determining in which wedge in a disk surface a given user data block resides, while reducing processor execution overhead.

SUMMARY OF THE INVENTION

This invention can be regarded as a method of selecting format specific parameters in a disk drive comprising a control system and a plurality of disk surfaces each having a surface format for storing data, wherein at least one surface format is different than other surface formats. The method includes initializing the disk drive for operation, receiving a data transfer command, and selecting a disk surface for performing data transfer operations based on the received data transfer command.

The method further includes selecting a format specific data structure corresponding to the selected disk surface, calculating a format specific variable using the selected format specific data structure, and performing the data transfer operations by the control system based on the calculated variable.

DETAILED DESCRIPTION OF THE INVENTION

Figure 1:
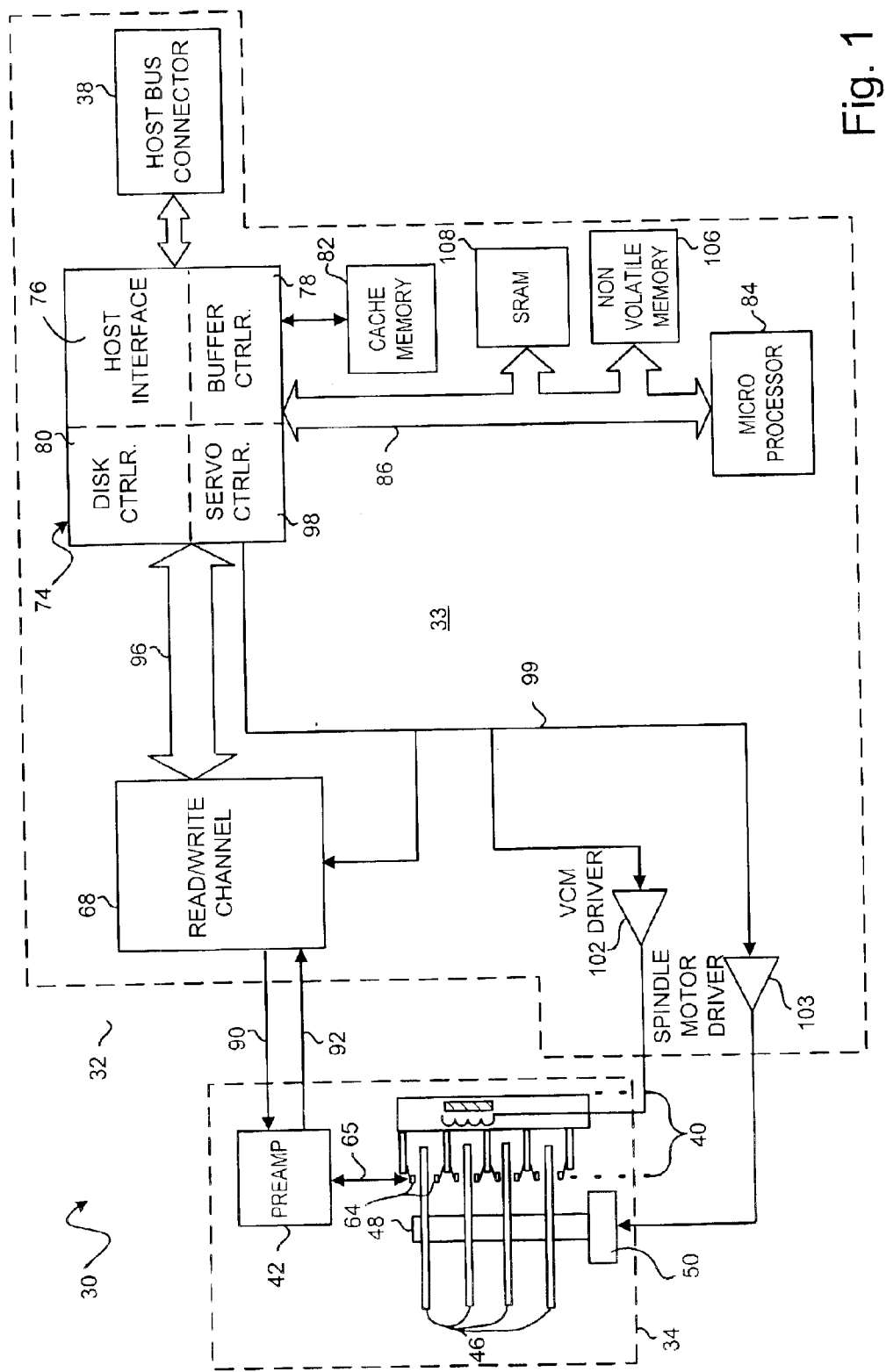
FIG. 1 is a block diagram of a disk drive in which the invention may be practiced.

With reference to FIG. 1, a block diagram of a disk drive 30 is shown in which the invention may be practiced. Disk drive 30 is connectable to a host computer (not shown) via host bus connector 38 for the transfer of commands, status and data. One suitable standard for such connection is the Advanced Technology Attachment (ATA) standard presently favored for desktop personal computers. Disk drive 30 comprises a Head Disk Assembly (HDA) 34, and a disk drive control system 33 mounted on a printed circuit board assembly PCBA 32.

As shown in FIG. 1, HDA 34 comprises one or more disks 46 for data storage; a spindle motor 50 for rapidly spinning each disk 46 (four shown) on a spindle hub 48; and an actuator assembly 40 for swinging heads 64 in unison over each disk 46. The heads 64 are connected to a preamplifier 42 via a trace assembly 65 for reading and writing data on disks 46. Preamplifier 42 is connected to channel circuitry in control system 33 via read data line 92 and write data line 90.

The control system 33 comprises a read/write channel 68, host interface and disk controller (HIDC) 74, voice coil motor driver (VCM) 102, spindle motor driver (SMD) 103, microprocessor 84, and several memory arrays such as buffer or cache memory 82, static random access memory (SRAM) 108, and non-volatile memory 106. A serial bus 99 provides a medium for bi-directional transfer of digital data for programming and monitoring channel 68, VCM driver 102 and SMD 103. Host-initiated operations for reading and writing data in disk drive 30 are executed under control of microprocessor 84 connected to the controllers and memory arrays via a bus 86. Program codes that are executed by microprocessor 84 is stored in non-volatile memory 106 and random access memory SRAM 108. Program overlay code stored on reserved tracks of disks 46 may also be loaded into SRAM 108 as required for execution.

During disk read and write operations, data transferred by preamplifier 42 is decoded and encoded by read/write channel 68. During read operations, channel 68 decodes data into digital bits transferred on an NRZ bus 96 to HIDC 74. During write operations, HIDC 74 provides digital data over the NRZ bus 96 to read/write channel 68 which encodes the data prior to its transmittal to preamplifier 42.

The HIDC 74 comprises a disk controller 80 for formatting and providing error detection and correction of disk data, a host interface controller 76 for responding to commands from host 36, and a buffer controller 78 for storing data which is transferred between disks 46 and host (not shown). Collectively the controllers in HIDC 74 provide automated functions which assist microprocessor 84 in controlling disk operations.

The servo controller circuit 98 in HIDC 74 provides an interface between microprocessor 84 and actuator assembly 40 and spindle motor 50. Microprocessor 84 commands logic in servo controller 98 to position actuator 40 using a VCM driver 102 to precisely control the rotation of spindle motor 50 with a spindle motor driver 103.

Figure 2:
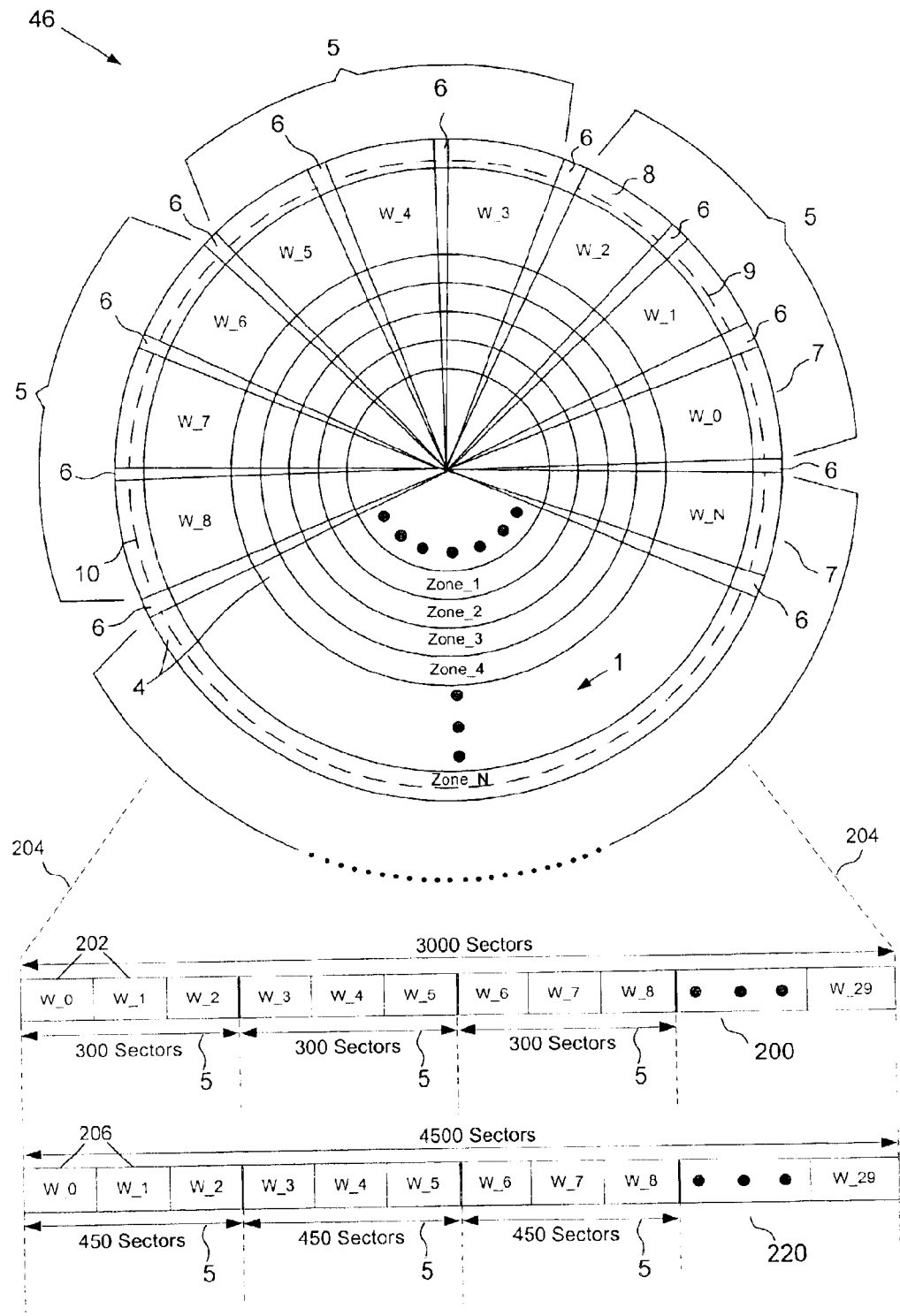
FIG. 2 illustrate a disk formatted for use with a disk drive employing an embodiment of the present invention.

FIG. 2 illustrate a disk 46 formatted for use with disk drive 30 shown in FIG. 1. The disk 46 has two surfaces 1 and 2 (not shown) that are of different surface formats from one another. Each of disk surfaces 1 and 2 is partitioned into radially-spaced concentric zones 4, such as zone__1 through zone__N, each of which have a number of tracks 8. Each track 8 comprises data sectors, such as data sector 9. Each disk surface further includes embedded servo sectors 6 disposed on the disk surfaces between angularly-spaced wedge-like areas 7, such as W__0 through W__N, for use in positioning the head 64 over a desired track 8 during write and read operations. Suitably, data sectors are recorded in the intervals between servo sectors 6 on each track 8. Servo sectors 6 are then sampled at regular intervals by channel 68, and are processed by servo controller 98 to provide position information to microprocessor 84 via bus 86. In an embodiment of the present invention, each disk surface is logically partitioned into wedge-groups 5, with each wedge-group 5 having the same number of wedges 7, such as three, as the other wedge-groups 5. Suitably, each data sector in each wedge 7 of a wedge-group 5 has the same timing value as a corresponding sector in a corresponding wedge 7 of other wedge-groups 5.

Figure 3:
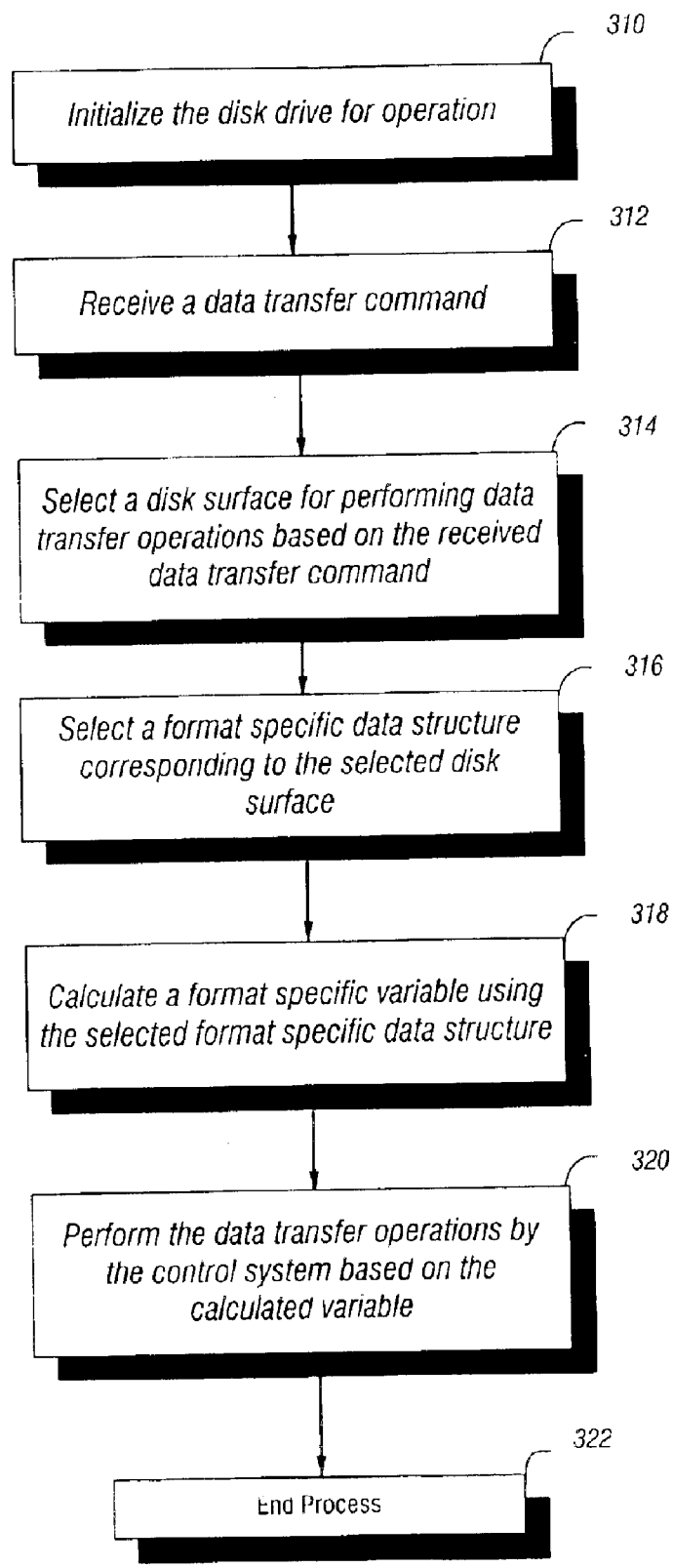
FIG. 3 is a flow chart illustrating a process used in an embodiment of the invention.

Referring to FIG. 3 in conjunction with FIG. 2, a process used in an embodiment of the invention is illustrated for selecting format specific parameters in a disk drive. As shown, the process begins at block 310 in which the disk drive 30 is initialized for operation. Next, in block 312, a data transfer command is received in the disk drive 30. Suitably, the data transfer command is received from a host computer (not shown) in communication with the disk drive 30.

Next, in block 314, a disk surface (such as disk surface 1 or 2) is selected for performing data transfer operations based on the received data transfer command. Next, in block 316, a format specific data structure is selected that corresponds to the selected disk surface, such as to disk surface 1. In an embodiment of the present invention, the format specific data structure comprises a sector-variable-number corresponding to the number of sectors in each wedge-group 5, and a wedge-variable-number corresponding to the number of wedges 7 in each wedge-group 5. Suitably the selected format specific data structure comprises a table (sometime referred to as a hard-sector description table (HSDT) by those in the art) having a timing map of the sectors, as well as wedge-variable-number, sector-variable number and other data corresponding to a location of a selected sector on a disk surface with which the position of a head 64 on a disk surface is compared by the control system 33 to verify the correct positioning of the head 64 over a desired portion of the disk surface.

Next, in block 318, a format specific variable is calculated using the selected format specific data structure, as described below and in greater detail in conjunction with FIG. 4. Suitably, the format specific variable is a wedge-position-number for a selected sector in a zone on the selected disk surface, such as for data sector 9 in zone__N of the disk surface 1. Next, in block 320, the data transfer operations are performed by the control system 33 based on the calculated variable. The flow then proceeds to block 322 in which the process ends.

Figure 4:
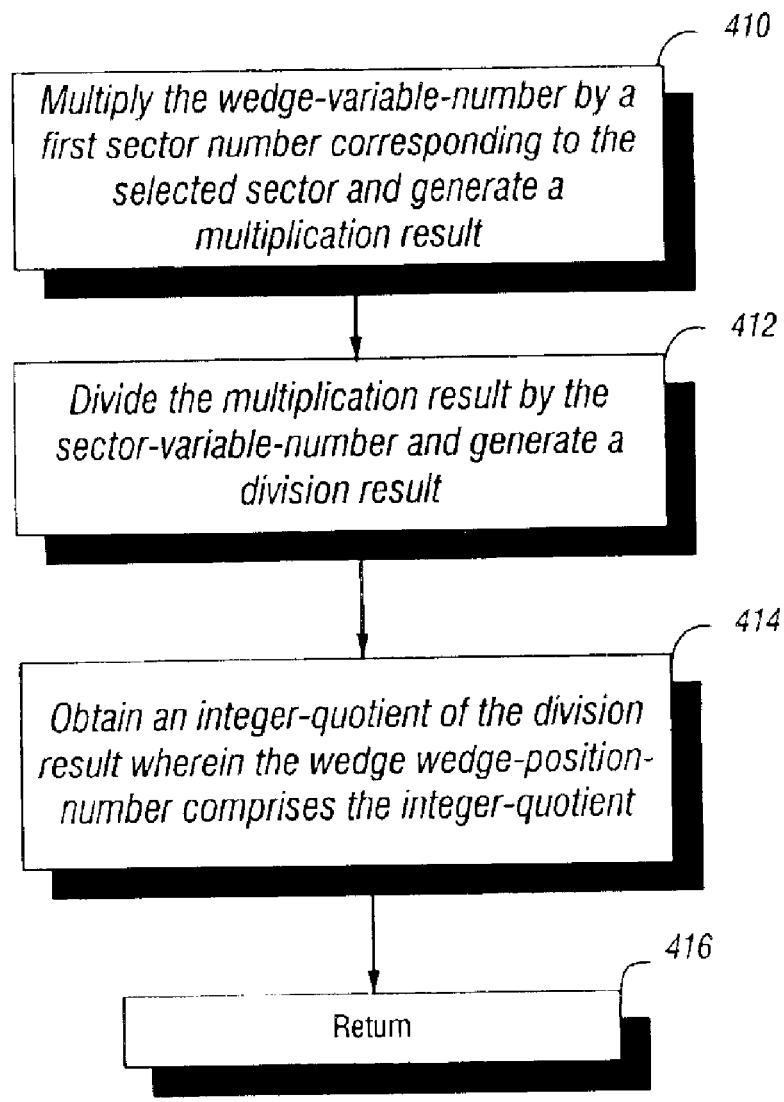
FIG. 4 is a flow chart further illustrating the process used in the embodiment of the invention shown in FIG. 3.

FIG. 4, in conjunction with FIG. 2, illustrate in greater detail the calculating process in block 318 of FIG. 3. As shown in FIG. 4, the process begins at block 410 in which the wedge-variable-number for a selected disk surface is multiplied by a sector number corresponding to a selected sector, such as sector 9, on the selected disk surface. A multiplication result is thereafter generated. In an embodiment of the present invention, the sector number is a physical sector address for the selected sector translated from an obtained logical block address (LBA) of the selected selector via a translation process that translates the LBA into an internal absolute block address (ABA) that is eventually translated into a physical sector address and track address. In another embodiment of the present invention, the sector number used in the multiplication is obtained by subtracting an integer value, such as 1, from a sector number corresponding to the selected sector.

For ease of illustrating the process of the present invention shown in FIG. 4, an exemplary disk 46 with two surfaces 1 and 2 having different surface formats is provided in FIG. 2 and used throughout the detailed description. As shown by lines 204, the track-diagram 200 is a linear representation of a circular track 8 of surface 1 of disk 46, with each block 202 corresponding to one wedge 7 on surface 1. For exemplary purposes, track-diagram 200 represents a disk surface 1 formatted for thirty wedges 7 (W__0 to W__29) and having a track 8 of 3,000 sectors distributed equally between ten wedge-groups 5 of three wedges each (thus the wedge-variable-number is 3), and having 300 sectors per wedge-group (thus the sector-variable-number is 300). As also shown in FIG. 2, the track-diagram is a linear representation of a circular track 8 of surface 2 of disk 46, with each block 206 corresponding to one wedge 7 on surface 2. For exemplary purposes, track-diagram 220 represents a disk surface 2 formatted for thirty wedges 7 (W__0 to W__29) and having a track 8 of 4,500 sectors distributed equally between ten wedge-groups 5 of three wedges each (thus the wedge-variable-number is 3), and having 450 sectors per wedge-group (thus the sector-variable-number is 450).

Following the above example, the calculation process of the present invention is applied to exemplary sectors 9 and 10 as shown in FIG. 2 for each of the surfaces 1 and 2. For exemplary purposes, sector 9 in surface 1 represents a data sector with an obtained physical sector number of 150, and sector 10 represents a data sector with an obtained physical sector number of 850. The multiplication result of block 410 would thus be 450 (i.e. 3 multiplied by 150) for sector 9, and 2550 (i.e. 3 multiplied by 850) for sector 10, in surface 1.

For exemplary purposes, sector 9 in surface 2 represents a data sector with an obtained physical sector number of 200, and sector 10 represents a data sector with an obtained physical sector number of 1250. The multiplication result of block 410 would thus be 600 (i.e. 3 multiplied by 200) for sector 9, and 3750 (i.e. 3 multiplied by 1250) for sector 10, in surface 2.

Next, in block 412, the multiplication result of block 410 is divided by the sector-variable-number, and a division result is generated. In the above example, the sector-variable-number for surface 1 is 300, as shown by track-diagram 200. Thus, division results of block 412 for sector 9 is 1.5 (i.e. 450 divided by 300), and for sector 10 is 8.5 (i.e. 2550 divided by 300), in surface 1. Similarly, the sector-variable-number for surface 2 is 450, as shown by track-diagram 220. Thus, division results of block 412 for sector 9 is 1.5 (i.e. 600 divided by 450), and for sector 10 is 8.33 (i.e. 3750 divided by 450), in surface 2.

Next, in block 414, an integer-quotient of the division result is obtained wherein the wedge-position-number comprises the integer-quotient. In the above example, for surface 1, the integer quotient of block 414 for sector 9 is 1, and for sector 10 is 8. Thus the wedge-position-number for sector 9 is 1, signifying that sector 9 is in host wedge W__1, and the wedge-position-number for sector 10 is 8, signifying that sector 10 is in host wedge W-8, as shown in FIG. 2 for surface 1. Similarly, for surface 2 the integer quotient of block 414 for sector 9 is 1, and for sector 10 is 8. Thus the wedge-position-number for sector 9 is 1, signifying that sector 9 is in host wedge W__1, and the wedge-position-number for sector 10 is 8, signifying that sector 10 is in host wedge W__8.

Next, the process flow then proceeds to block 416 for returning to block 318 of FIG. 3. The overall process flow then proceed to in block 320 of FIG. 3 as described above. It should be noted that the sequence of mathematical operations as shown in FIG. 4 and used in the provided example is meant to be exemplary only and any rearrangement of the foregoing sequence of the mathematical operations which results in the calculation of a wedge position number for a selected sector is contemplated to be within the scope of the present invention.

One advantage of the present invention over the prior art is that by performing the foregoing process, it can be determined on the fly in which wedge in a disk surface on a disk a given data sector resides, thus minimizing the need for increased memory for storing one or more wedge position tables and the increased processor execution overhead associated with performing searches of a larger number of wedge position tables.

What is claimed is:

1. A method for selecting format specific parameters in a disk drive comprising a control system and a plurality of disk surfaces each having a surface format for storing data, wherein at least one surface format is different than other surface formats, the method comprising:

initializing the disk drive for operation;

receiving a data transfer command;

selecting a disk surface for performing data transfer operations based on the received data transfer command;

selecting a format specific data structure corresponding to the selected disk surface;

calculating a format specific variable using the selected format specific data structure; and performing the data transfer operations by the control system based on the calculated variable.

2. The method as claimed in claim 1, wherein the selected disk surface comprises a plurality of zones and wherein the format specific variable is a wedge-position-number for a selected sector in a zone on the selected disk surface.

3. The method as claimed in claim 2, wherein the selected disk surface is logically partitioned into a plurality of wedge-groups having the same number of wedges in each wedge-group, wherein each sector in each wedge of a wedge-group having the same timing value as a corresponding sector in a corresponding wedge of other wedge-groups.

4. The method as claimed in claim 3, wherein the selected format specific data structure comprises:

a sector-variable-number corresponding to number of sectors in each wedge-group; and a wedge-variable-number corresponding to the number of wedges in each wedge-group.

5. The method as claimed in claim 4, wherein the calculating the format specific variable further comprises:

multiplying the wedge-variable-number by a first sector number corresponding to the selected sector and generating a multiplication result;

dividing the multiplication result by the sector-variable-number and generating a division result; and obtaining an integer-quotient of the division result wherein the wedge wedge-position-number comprises the integer-quotient.

6. The method as claimed in claim 5, wherein the first sector number is obtained by subtracting an integer value from a second sector number corresponding to the selected sector.

7. The method as claimed in claim 6, wherein the integer value is 1.

8. The method as claimed in claim 6, wherein the second sector number is a physical sector address for the selected sector translated from an obtained logical block address of the selected selector via a translation process.

9. The method as claimed in claim 5, wherein the first sector number is a physical sector address for the selected sector translated from an obtained logical block address of the selected selector via a translation process.

10. The method as claimed in claim 3, wherein the selected format specific data structure comprises a hard-sector description table (HSDT) having the wedge-variable-number.

11. The method as claimed in claim 3, wherein the selected format specific data structure comprises a hard-sector description table (HSDT) having the sector-variable-number.

12. The method as claimed in claim 1, wherein the data transfer command is received from a host computer in communication with the disk drive.

* * * * *